3,345,329
SATURATED LINEAR POLYESTERS OF
2,2 - DIMETHYLOL ENDOMETHYLENE
CYCLOHEXANE
Siegfried Sommer and Ludwig Brinkmann, Frankfurt am Main, Germany, assignors to Farbwerke Hoechst Aktiengesellschaft vormals Meister Lucius & Bruning, Frankfurt am Main, Germany, a corporation of Germany
No Drawing. Filed June 11, 1963, Ser. No. 286,923
Claims priority, application Germany, June 13, 1962, F 34,049
2 Claims. (Cl. 260—47)

The present invention relates to a process for preparing saturated llinear polyesters. The invention also relates to a process for preparing saturated linear polyesters having a high second order transition temperature and very little tendency to crystallize. The invention relates in particular to a process for preparing saturated linear polyesters having a good surface hardness and impact strength and a transparency that is not even affected by high temperatures, these polyesters being suitable for the preparation of shaped structures that do not shrink.

It is known that high-melting linear polyesters that can be used for the preparation of fibers, filaments and films can be prepared by the reaction of dialkyl esters of aromatic dicarboxylic acids with aliphatic diols. However, due to their pronounced tendency to crystallize and, consequently, to shrink these products cannot be used for the preparation of shaped articles by injection-molding. Moreover, crystallization and after-crystallization usually lead to an undesired turbidity of the shaped structures. One condition for a crystallization taking place in polyesters is that the marcromolecules are able to form a crystal lattice, and a second condition is that they are able to arrange themselves in the crystal lattice at a sufficiently high speed. Polyethylene terephthalate fulfils these two requirements.

It is desirable to prepare hard, clear shaped articles that neither crystallize nor get brittle from plastic masses having a second order transition temperature above 100° C., preferably above 120° C.

Polyethylene terephthalate has a second order transition temperature within the range of 70° to 80° C. When shaped articles prepared from plastic materials by the injection molding process are used, they are often exposed to this temperature. Due to the range of its second order transition temperature and its pronounced tendency towards crystallization, polyethylene terephthalate is not suitable for use in the preparation of thick articles by extrusion or injecting molding.

Now we have found that saturated linear polyesters can be obtained by polycondensing aromatic dicarboxylic acids containing one or two benzene nuclei and the carboxyl groups of which do not stand in ortho-position to one another, or the derivatives thereof that are capable of forming polyesters, under known conditions, with 2,2-dimethylol endomethylene cyclohexane or mixtures thereof with other diols.

The polyesters prepared by the process according to the invention have a high second order transition temperature and very little tendency towards crystallization. Shaped articles prepared from such polyesters do not exhibit the shrinking observed with polyethylene terephthalate. The polyesters prepared by the process according to the invention have a good surface hardness, and their impact strength is sufficient for practical purposes. The transparency of the articles prepared from the polyesters according to the invention is not even affected when they are used at high temperatures.

2,2-dimethylol endomethylene cyclohexane has also the effect of considerably increasing the second order transition temperature of copolyesters of ethylene glycol, 2,2-dimethylol endomethylene cyclohexane and aromatic dicarboxylic acids, for example, terephthalic acid. In polycondensation products of this kind, the crystallization is prevented to a large extent; and they can well be used for the manufacture of shaped articles.

In order to prepare the 2,2-dimethylol endomethylene cyclohexane by synthesis, acrolein is first added to cyclopentadiene by a known method according to a diene synthesis. The endomethylene tetrahydrobenzaldehyde thus obtained is reacted in an alkaline medium with formaldehyde. Then hydrogen is catalytically added to the resulting unsaturated diol, which is thereby converted into 2,2-dimethylol endomethylene cyclohexane.

Other diols, for example, ethylene glycol, propane diol-(1,3), butane diol-(1,4), neopentyl glycol, dimethylol cyclohexane-(1,4), dimethylol cyclohexane-(1,3), p-xylylene glycol and m-xylylene glycol, or bis-$\beta$-hydroxy ethyl ethers of diphenols, for example, 4,4' - di - ($\beta$ - hydroxy ethoxy)-benzene, 2,6-di-($\beta$-hydroxy ethoxy)-naphthalene and 2,2-di-(4-$\beta$-hydroxy ethoxy phenyl)-propane may be used in admixture with 2,2 - dimethylol endomethylene cyclohexane.

Mixtures of more than two diols may also be used. In this case, the mixture should comprise at least 50 mols percent, preferably 70 to 95 mols percent, calculated on the total sum of the diol components, of 2,2 - dimethylol endomethylene cyclohexane.

Suitable aromatic dicarboxylic acids are, for example, terephthalic acid, isophthalic acid, diphenyl dicarboxylic acid-(4,4'), carboxylic acids of the general formulae

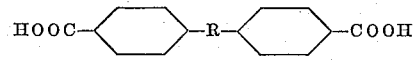

and

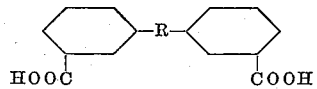

in which R represents a bivalent radical, for example,

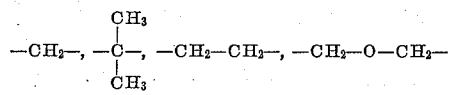

and naphthalene dicarboxylic acids such as naphthalene dicarboxylic acid-(1,4), naphthalene dicarboxylic acid-(1,5), naphthalene dicarboxylic acid - (2,6) or perylene dicarboxylic acid.

It is particularly advantageous to use terephthalic acid as the aromatic dicarboxylic acid. Partially araliphatic or aliphatic dicarboxylic acids, may also be used. If terephthalic acid is used together with one or more other dicarboxylic acids the proportion of terephthalic acid is advantageously not less than 50 mols percent, preferably not less than 70 mols percent, calculated on the total sum of the dicarboxylic acids used.

Mixtures of 95 to 50 mols percent of terephthalic acid and 5 to 50 mols percent of isophthalic acid are particularly suitable since the polyesters prepared from these aromatic dicarboxylic acids by the process according to the invention have advantageous mechanical properties.

Instead of dicarboxylic acids, their derivatives, for example, esters, with aliphatic alcohols containing 1 to 6 carbon atoms, in particular dimethyl ester, and halides are advantageously used for the preparation of polyesters.

The polycondensation is carried out in known manner, for example, by reacting a diester of an aromatic dicarboxylic acid at an elevated temperature with a bifunctional hydroxyl compound or a mixture of bifunctional hydroxyl compounds. It is suitable first to prepare a precondensation product from the diol used according to the invention and the aromatic dicarboxylic acid. Since 2,2-dimethylol endomethylene cyclohexane has a relatively high boiling point and since it is difficult to eliminate an excess of this diol during the condensation proper, it is indicated to use a bifunctional hydroxy compound having a lower boiling point than 2,2-dimethylol endomethylene cyclohexane, for example, of ethylene glycol, in addition to the other substances in the interchange of ester radicals.

The interchange of ester radicals is carried out at a temperature within the range of about 160° to 220° C. while the corresponding alcohol of low molecular weight, for example, methanol, is distilled off. It is advantageous to add small quantities of catalytically effective substances such as zinc acetate or calcium acetate. In the subsequent polycondensation, the reaction mixture is heated to a temperature within the range of about 220° to 280° C., while stirring and while constantly reducing the pressure. In the final phase of the polycondensation, the pressure is suitably below 1 mm. of mercury. In this stage of the condensation, macromolecules are formed and the excess portions of diols having a lower boiling point than 2,2-dimethylol endomethylene cyclohexane, for example, ethylene glycol, are distilled off. In this operation, heavy metal oxides, for example, antimony trioxide, are efficacious catalysts.

The preparation of the polyesters may also be carried out in the presence of titanic acid esters, for example, titanic acid butyl ester. These esters are effective catalysts both for the interchange of ester radicals and the polycondensation. The polyesters may also be prepared by another method, for example, from dicarboxylic acid chlorides and diols.

The polyesters prepared by the process according to the invention from aromatic dicarboxylic acids and 2,2-dimethylol endomethylene cyclohexane or from mixtures of 2,2-dimethylol endomethylene cyclohexane and other diols are colorless or faintly colored clear masses which have a relatively high average molecular weight and are suitable for the preparation of shaped articles by the injection molding or extrusion molding process. The shaped articles prepared from these polyesters have a high degree of transparency.

The following examples serve to illustrate the invention, but they are not intended to limit it thereto.

*Example 1*

150 grams of terephthalic acid dimethyl ester and 108 grams of 2,2-dimethylol endomethylene cyclohexane were mixed with 76 grams of ethylene glycol, and 34 mg. of zinc acetate were added. The mixture was heated to 160° C. whilst being stirred and while methanol was distilled off in a descending condenser. In the course of three hours, the temperature was raised to 210° C.; and the mixture was stirred at this temperature until no more methanol was eliminated by distillation. The mixture was then cooled to room temperature, and 45 mg. of antimony trioxide were added. The product obtained by the interchange of ester radicals was heated to 250° C., while stirring. In the course of about three hours, the temperature was raised from 250° C. to 280° C.; and simultaneously the pressure was gradually reduced to less than 1 mm. of mercury. Under these conditions of pressure and temperature, stirring was continued for another five hours. The reaction product obtained was a clear, almost colorless mass having a second order transition temperature of 142° C. and a reduced specific viscosity of 1.1 (determined at 20° C. in a solution of 1% strength in phenol and tetrachlorethane containing these two substances in a ratio of 60:40). The polyester thus obtained could be transformed into shaped articles having an excellent impact strength and a good surface hardness.

*Example 2*

150 g. of terephthalic acid dimethyl ester, 60.3 g. of 2,2-dimethylol endomethylene cyclohexane, and 96 g. of ethylene glycol were mixed. 34 mg. of zinc acetate were added to serve as a catalyst for the interchange of ester radicals. Interchange of ester radicals and polycondensation were carried out in the manner described in Example 1. 45 mg. of antimony trioxide were added to serve as a catalyst for the polycondensation. The mixture was stirred for 2½ hours at 280° C. under a pressure of 0.1 mm. of mercury. A colorless, transparent resin was obtained which had a second order transition temperature of 123° C. and a reduced specific viscosity of 0.8 (determined at 20° C. in a solution of 1% strength in phenol and tetrachlorethane containing these two substances in a ratio of 60:40).

*Example 3*

A mixture of 100 g. of terephthalic acid dimethyl ester, 50 g. of isophthalic acid dimethyl ester, 108 g. of 2,2-dimethylol endomethylene cyclohexane, and 76 g. of ethylene glycol was reacted in the manner described in Example 1. 34 mg. of zinc acetate and 45 mg. of antimony trioxide were added to serve as a catalyst. The polyester thus obtained had a better notched-bar impact strength than the polyester described in Example 1 and approximately the same second order transition temperature and a reduced specific viscosity of 1.2 (determined at 20° C. in a solution of 1% strength in phenol and tetrachlorethane which contained these two substances in a ratio of 60:40).

*Example 4*

A mixture of 150 g. of isophthalic acid dimethyl ester, 108 g. of 2,2-dimethylol endomethylene cyclohexane and 76 g. of 2,2-dimethylol endomethylene cyclohexane and 76 g. of ethylene glycol was reacted in the manner described in Example 1. 34 mg. of zinc acetate and 45 mg. of antimony trioxide were added to serve as catalysts. A transparent light brownish resin was obtained which had a second order transition temperature of 110° C. and a reduced specific viscosity of 0.9 (determined at 20° C. in a solution of 1% strength in phenol and tetrachlorethane which contained these two substances in a ratio of 60:40).

*Example 5*

A mixture of 188.5 g. of naphthalene-2,6-dicarboxylic acid dimethyl ester, 108 g. of 2,2-dimethylol endomethylene cyclohexane and 76 g. of ethylene glycol was reacted in the manner described in Example 1. 34 mg. of zinc acetate were added to serve as a catalyst for the interchange of ester radicals and 45 mg. of antimony trioxide were added to serve as a catalyst for the polycondensation. A transparent resin was obtained which had a faintly yellowish coloration, a second order transition temperature within the range of 130° to 140° C., and a reduced specific viscosity of 0.97 (determined at 20° C. in a solution of 1% strength in phenol and tetrachlorethane containing these two substances in a ratio of 60:40).

We claim:
1. A saturated linear polyester of an aromatic dicarboxylic acid having up to two benzene nuclei, each of the carboxyl groups of said dicarboxylic acid being bound to a ring carbon atom, the two carboxyl acid groups having at least one ring carbon atom between one another, and a diol, said polyester containing at least 50 percent of 2,2-dimethylol endomethylene cyclohexane as the diol component.

2. A saturated linear polyester according to claim 1 wherein the diol component also contains ethylene glycol, propane diol (1,3), butane diol (1,4), neopentyl glycol, dimethylol cyclohexane, p-xylylene glycol, m-xylylene glycol or bis-β-hydroxyethyl ethers of diphenols.

References Cited
UNITED STATES PATENTS

| | | | |
|---|---|---|---|
| 2,417,100 | 3/1947 | Bruson et al. | 260—617 |
| 2,980,649 | 4/1961 | Caldwell et al. | 260—75 |
| 3,233,009 | 2/1966 | Carlick et al. | 260—871 |

OTHER REFERENCES

Krieger et al.: Chem. Abstracts, vol. 57, page 8460 (1962).

WILLIAM H. SHORT, *Primary Examiner.*

C. A. WENDEL, L. P. QUAST, *Assistant Examiners.*